May 29, 1951     W. R. PERRET     2,554,792
PRESSURE MEASURING DEVICE
Filed Sept. 28, 1948
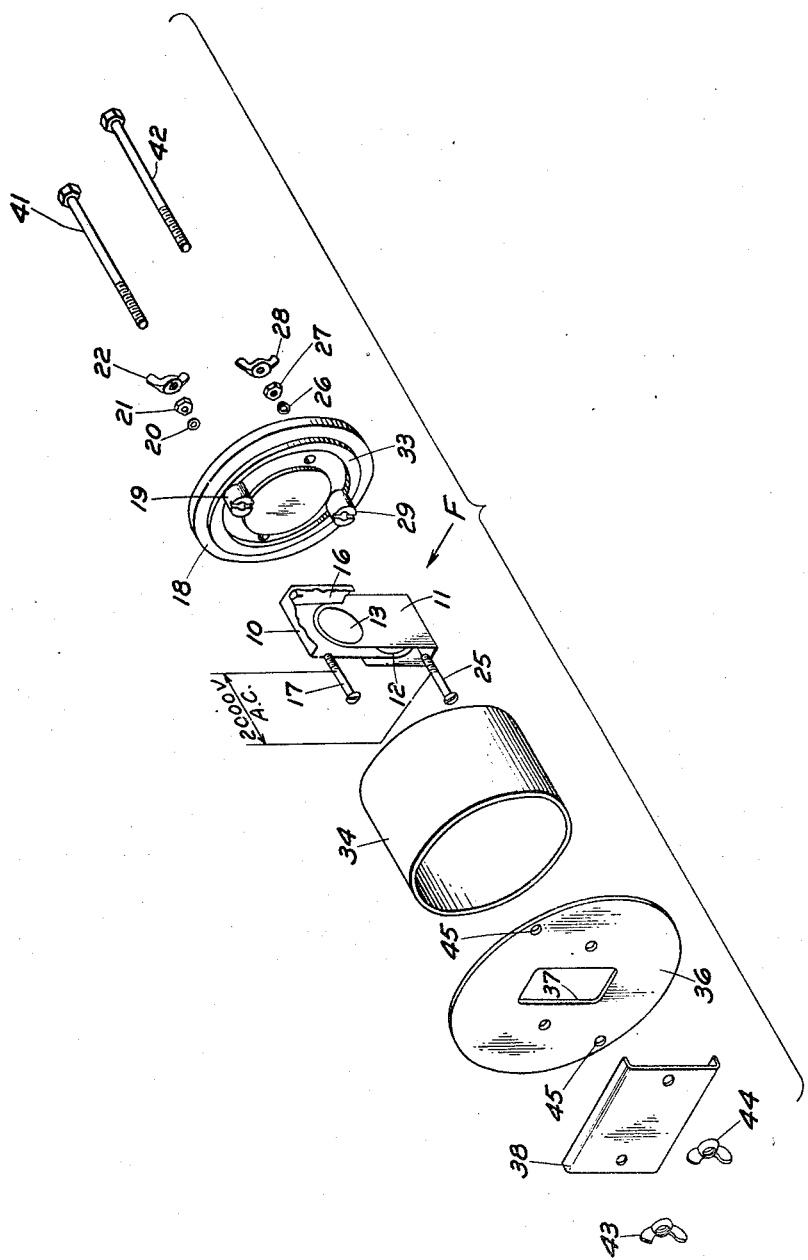
INVENTOR.
William R. Perret
BY
ATTORNEY Patented May 29, 1951

2,554,792

UNITED STATES PATENT OFFICE 2,554,792

PRESSURE MEASURING DEVICE

William R. Perret, Vicksburg, Miss., assignor, by mesne assignments, to the United States of America as represented by the United States Atomic Energy Commission Application September 28, 1948, Serial No. 51,576

4 Claims. (Cl. 313—161)

The present invention relates to measurement of pressure and particularly of low pressures of gases in the range from 0.001 micron to 1 micron of mercury. The present application is related to the earlier application of the herein inventor and Thomas Davis, Serial No. 581,260, filed March 6, 1945, now Patent No. 2,506,431. The earlier application relates to a modified form of Philips ionization pressure gauge, wherein the structure is such that operating with an applied A. C. potential, the gauge fires on both half-cycles of the applied potential and the current conducted by the gauge is a full wave current. The gauge is of the type which is shown and described in detail in the patent of F. M. Penning, No. 2,197,079. The most commonly known of the structural arrangements shown in the latter patent, is that consisting of two plane parallel cathode plates arranged in a magnetic field perpendicular to the plates and having a ring shaped anode parallel to, and midway between, the cathode plates. When this structure as shown in the patent, as is well known, is operated on A. C. potential, the gauge conducts current only on that half-cycle when the ring shaped anode is positive, since on the ring-negative half-cycle the gauge is swept clean of ions and there is no conduction.

The earlier application referred to above, provides a modified form of gauge wherein there are four spaced electrodes including two anodes which are of ring-like construction as in the Penning patent. This device succeeds in achieving its objective of having the gauge fire on both half-cycles of an applied A. C. potential, one of the anode members being positive on each half-cycle, the gauge thus conducting a full wave current. The four electrode structure of the earlier application is, in effect, two Philips gauges wherein each has electrodes in common with the other. The anode members are in the form of a flat plate with a circular opening and the anode member of each gauge section serves as one of the cathode plates of the other gauge section on its negative half-cycle. It is to be seen, therefore, that each of the two sections of the gauge does not constitute a complete reproduction of the Philips gauge as shown in the Penning patent referred to above, since the cathode plates, as such, are not exactly alike, one of them of course having the circular opening therein. The device does, however, achieve its intended objective and is advantageous in that it conducts a full wave current and the two sections of the gauge are perfectly symmetrical so that it is unpolarized; i. e., it makes no difference which side of the line, supplying operating power, is connected to either of its terminals.

The invention of the present application involves a novel change in the arrangement of the earlier application, whereby a desired and advantageous result may be achieved by the modification in structure. In the earlier application the desired structural arrangement is produced in one modification, by providing two U-shaped members; each having one leg interleaved between the legs of the other member and the two interleaved legs having axially aligned circular openings. By the present modification, as will appear more in detail hereinafter, I provide a change in the structural arrangement whereby the interleaved legs of the U-shaped members are longer, i. e., they are extended so that the circular openings are fully offset from each other, each lying between adjacent solid portions of the legs of the other member and thus there are provided two complete Philips gauges of the type shown in the Penning patent, the two complete gauges being formed from the two U-shaped members and these gauges each being substantially complete reproductions of the gauge shown in the Penning patent. The device is thus unpolarized with reference to an applied A. C. or D. C. potential. On each half-cycle of an applied A. C. potential a complete Philips gauge is presented to the applied potential. Similary a complete Philips gauge is presented to an applied D. C. potential regardless of the polarity connected to either of the two symmetrical electrodes.

The details of construction of the invention will appear in the ensuing description.

In accordance with the foregoing, the object of the invention is to provide a pressure measuring device of the Philips gauge type, consisting, in essence, of two Philips gauges so connected to a source of A. C. or D. C. power supply that corresponding electrodes of the two gauges are opposite in polarity; i. e., the anodes are connected to opposite sides of the line and the two pairs of cathode members are also connected to opposite sides of the line.

Another object is to provide a device, as in the foregoing object, wherein the structure comprises two U-shaped members each having a longer leg which is interleaved between the legs of the other member; the interleaved legs each having an opening disposed between adjacent solid portions of the legs of the other member.

The single figure of the drawing is a disassembled, perspective view of a preferred form of the device of my invention.

Referring to the drawing, the device comprises two similar U-shaped members, 10 and 11, each of which has one longer or extended leg as shown, each extended leg having a circular opening in it as indicated by the numerals 12 and 13. Each of the extended legs is interleaved, as shown, midway between the legs of the other U-shaped member so that the circular openings lie between adjacent solid portions of the legs of the other member. Thus there are formed two Philips gauges which are similar in structure and function to the gauge shown in the patent to Penning, referred to above. The magnetic field, as indicated by the arrow at F, is perpendicular to the legs of the U-shaped members. The operation of gauges of this type is now well known in the art as described in the Penning patent, and in the earlier application referred to above. The U-shaped member 10 has a portion 16 lying in a plane perpendicular to the legs and this portion has an opening near the web connecting the legs, through which a bolt 17 may pass to attach the member to a ceramic disc 18 having a spacer member 19 protruding from the disc as shown, to space member 10 from the disc. A shallow slot in the spacer member 19 of the ceramic disc accommodates a linear dimple pressed into the base portion 16 of the electrodes at the fastening hole and serves to align the two electrodes properly and parallel to each other. When assembled, the parts so far described are held together by a washer 20, lock nut 21 and wing nut 22, which cooperate with bolt 17. The U-shaped member 11 is identical in construction and it is similarly attached to the disc 18 by bolt 25 cooperating with washer 26, lock nut 27 and wing nut 28, a second spacer member 29 being provided to space the member 11 from the disc 18. Similar alignment provision is made on member 11 and spacer 29.

The power supply may be 2000 volt A. C. source as shown or a 3000 volt D. C. source which may connect to the bolts 17 and 25 on the outer side of the disc 18, the disc thus serving as an insulator to insulate the members 10 and 11 from each other and from ground.

The disc 18 has an annular rib 33 on the side which is visible on the drawing as shown, and when the parts are assembled, this rib, or flange, fits inside of a cylinder or tube 34 which encloses the members 10 and 11. This rib and the concentric boss in the ceramic disc also serve to form shadowed areas against spattered metal from the gauge to preserve the insulating properties of the ceramic disc surface. A flat disc 36 fits against the other end of the tube 34 and this disc has a central rectangular opening to allow equalization of pressure in the interior of tube 34 with that to be measured exteriorly to the gauge. A rectangular member 38 having edge flanges as shown, bears against the disc 36, and the disc 36, baffle member 38, and disc 18 each have a pair of aligned openings for through bolts 41 and 42 which pass through these openings for the purpose of holding all of the parts in assembled relationship, the bolts cooperating with wing nuts 43 and 44, which bear against the baffle plate 38. The disc 36 has a pair of openings 45 which are provided for the purpose of mounting the device, as a whole, wherever it may be desired, for example, for installing it in the interior of a calutron tank. The disc 36 is of larger diameter than tube 34 and the openings 45 are in the portion of the disc which extends beyond the periphery of the tube 34.

The device may be mounted in a calutron or similar tank as described, utilizing the magnetic field of the calutron for operating the gauge. The device may, of course, have its own enclosing envelope and it may have its own magnetic field producing means.

As pointed out in the foregoing, the device forms two gauges of the Philips gauge type and the corresponding electrodes of each gauge are opposite in polarity; i. e., the ring electrode or anode members 12 and 13, being connected to opposite sides of the source, are opposite in polarity, and the pair of parallel electrode or cathode plates associated with each ring electrode or anode member has polarity opposite to the other pair of parallel cathode plates. Thus the device is unpolarized in that either side of the line may be connected to either of its terminals, and this is true whether there is A. C. or D. C. power applied for operating the device. When A. C. is used, the resulting current is a full wave current since on each half-cycle one of the gauges has its ring electrode or anode member at positive polarity. When D. C. is used one of the ring electrodes will be positive regardless of the polarity of the external connections and the unit will perform as a normal D. C. Philips gauge.

In one sample gauge which was constructed and which worked satisfactorily, each U-shaped member was formed of $\frac{3}{32}$ inch thick sheet metal and had one leg forming a 1½ inch square plate and the other leg forming a plate 1½ inches by 2¾ inches with a 1 inch diameter hole. The legs were ½ inch apart with the interleaved legs midway between the legs of the other U-shaped member. The shell 34 was 3½ inches in diameter and the plate 36 was $\frac{3}{32}$ inch thick with the central opening 1 inch by 2 inches. These dimensions are representative of only one operative construction and it is to be understood of course, that any convenient dimensions might be used.

Having thus described my invention, I claim:

1. In a device of the character described, in combination, an envelope having an opening for the introduction of gaseous material, the pressure of which is to be measured, means within said envelope comprising two U-shaped members, one leg of each member being extended and being interleaved between the legs of the other member, each said one leg having an opening therethrough in its extended portion, the axes of said openings being spaced from each other and each opening lying between adjacent solid portions of the legs of the other U-shaped member, means forming a magnetic field having a direction perpendicular to the legs of said members, a source of potential, one of said members being connected to one side of said source and the other of said members being connected to the other side of said source whereby they have opposite polarity and each leg having an opening is between legs having polarity opposite to itself.

2. An improved device for measuring pressure comprising, in combination, an envelope having an opening therein for the introduction of a gas, two U-shaped electrode members disposed within said envelope, one leg of each member being extended and being interleaved between the legs of the other member, each said one leg having an opening therein through its extended portion, each of said openings being oriented between solid portions of the other U-shaped member, a source of potential, one of said members being connected to one side of said source and the other of said members being connected to the other side of said source, whereby said members are of opposite polarity and whereby each leg having an opening lies between legs having polarity opposite to itself, and means for forming a magnetic field about said members, said field having a direction divergent from the direction of the electric field between said members.

3. In an ion gage of the character described, the improved electrode arrangement comprising a pair of substantially U-shaped electrode members, one leg of each member being interleaved between the legs of the other member, each said one leg having an aperture therein to allow oscillation of electrons therethrough, the aperture in said leg of one member being disposed between solid portions of the legs of the other of said electrode members.

4. In an ion gage of the character described, the improved electrode arrangement comprising a pair of substantially U-shaped electrode members, the legs of said members being flat plates, one leg of each member being interleaved between the legs of the other member, each said one leg having an aperture therein near one extremity, the aperture in the leg of one of said members lying between adjacent solid portions of said flat plates of the other of said electrode members.

WILLIAM R. PERRET.

REFERENCES CITED

The following references are of record in the file of this patent:

UNITED STATES PATENTS

| Number | Name | Date |
|---|---|---|
| 1,988,459 | Pennybacker | Jan. 22, 1935 |
| 2,165,911 | Slepian | July 11, 1939 |
| 2,197,079 | Penning | Apr. 16, 1940 |
| 2,242,946 | Falk | May 20, 1941 |